United States Patent
Bradley et al.

(10) Patent No.: US 8,345,633 B2
(45) Date of Patent: Jan. 1, 2013

(54) METHOD OF IDENTIFICATION OF A FEMTOCELL BASE STATION AS A HANDOVER TARGET, AND APPARATUS THEREFOR

(75) Inventors: Nigel Bradley, Swindon (GB); Holger Claussen, Straffan (IE); Philip Charles Sapiano, Corsham (GB)

(73) Assignee: Alcatel Lucent, Paris (FR)

( * ) Notice: Subject to any disclaimer, the term of this patent is extended or adjusted under 35 U.S.C. 154(b) by 285 days.

(21) Appl. No.: 12/635,239

(22) Filed: Dec. 10, 2009

(65) Prior Publication Data

US 2010/0150109 A1    Jun. 17, 2010

(30) Foreign Application Priority Data

Dec. 12, 2008 (EP) ................................ 08291190

(51) Int. Cl.
*H04W 4/00* (2009.01)
(52) U.S. Cl. ...................... 370/331; 455/436
(58) Field of Classification Search .............. None
See application file for complete search history.

(56) References Cited

U.S. PATENT DOCUMENTS

| 2008/0305801 A1 | 12/2008 | Burgess et al. | |
| 2009/0111525 A1* | 4/2009 | Hwang et al. | 455/561 |
| 2009/0156213 A1* | 6/2009 | Spinelli et al. | 455/436 |

FOREIGN PATENT DOCUMENTS

| WO | WO 2008/055251 A2 | 5/2008 |
| WO | WO 2008/088592 A1 | 7/2008 |
| WO | WO 2008088592 A1 * | 7/2008 |

OTHER PUBLICATIONS

European Search Report.

* cited by examiner

*Primary Examiner* — Nittaya Juntima
*Assistant Examiner* — Khoa Huynh
(74) *Attorney, Agent, or Firm* — Fay Sharpe LLP

(57) ABSTRACT

A method is provided of identifying which one of a plurality of femtocell base stations neighboring a first femtocell base station is to be the target for handover of a call connection with a user terminal from the first base station. The neighbor femtocell base stations use the same primary scrambling code as each other. The femtocell base stations use code-division multiple access, CDMA. Each of the neighbor femtocell base stations transmits a respective broadcast signal that include timing information such that each neighbor femtocell base station transmits a broadcast signal having different timing information to that of the other neighbor femtocell base stations. The user terminal receives broadcast signals, determines the timing information of at least one of the received broadcast signals and reports the timing information to the first femtocell base station. The first femtocell base station identifies the target femtocell base station for handover from the timing information.

12 Claims, 4 Drawing Sheets

METHOD OF IDENTIFICATION OF A FEMTOCELL BASE STATION AS A HANDOVER TARGET, AND APPARATUS THEREFOR

FIELD OF THE INVENTION

The present invention relates to telecommunications, in particular to wireless telecommunications.

DESCRIPTION OF THE RELATED ART

Wireless telecommunications systems are well-known. Many such systems are cellular, in that radio coverage is provided by a bundle of radio coverage areas known as cells. A base station that provides radio coverage is located in each cell. Traditional base stations provide coverage in relatively large geographic areas and the corresponding cells are often referred to as macrocells.

It is possible to establish smaller sized cells within a macrocell. Cells that are smaller than macrocells are sometimes referred to as microcells, picocells, or femtocells, but we use the term femtocells generically for cells that are smaller than macrocells. One way to establish a femtocell is to provide a femtocell base station that operates within a relatively limited range within the coverage area of a macrocell. One example of use of a femtocell base station is to provide wireless communication coverage within a building.

The femtocell base station is of a relatively low transmit power and hence each femtocell is of a small coverage area compared to a macrocell.

Femtocell base stations are intended primarily for users belonging to a particular home or office. Femtocell base stations may be private access or public access. In femtocell base stations that are private access, access is restricted only to registered users, for example family members or particular groups of employees. In femtocell base stations that are public access, other users may also use the femtocell base station, subject to certain restrictions to protect the Quality of Service received by registered users.

One known type of Femtocell base station uses a broadband Internet Protocol connection "backhaul", namely for connecting to the core network. One type of broadband Internet Protocol connection is a Digital Subscriber Line (DSL). The DSL connects a DSL transmitter-receiver ("transceiver") of the femtocell base station to the core network. The DSL allows voice calls and other services provided via the femtocell base station to be supported. The femtocell base station also includes a radio frequency (RF) transceiver connected to an antenna for radio communications.

Femtocell base stations are sometimes referred to as femtos.

One problem of femtocell base stations, particular those involving code division multiple access, such as those in accordance with current Third Generation Partnership Project (3GPP) Universal Mobile Telecommunications System (UMTS) standards, is that there are few primary scrambling codes (PSCs) available. Primary scrambling codes are used to distinguish between neighbouring base stations. Typically, there are between six and sixteen PSCs that are available to the femtocells. The PSC to be used by each femtocell base station is selected by an automatic configuration process based on measurements made by that femtocell base station. For example, a femto detects from received signals which PSCs are in use around the femto, and selects a PSC that the femto has not detected as being in use, else selects the PSC of the weakest signal received. In consequence, there is typically use of each of the available primary scrambling codes by multiple femtos, in other words much primary scrambling code "re-use".

As is known, user terminals, currently in a cell, report measurements, to the base station of that cell, that the user terminals have made as to signals received from other nearby base stations. This is so as to determine whether it is appropriate to handover the call connection with the user terminal from that cell to another cell from which a stronger signal is received.

With this level of PSC reuse, there is a strong chance that user terminals served by a femto will detect signals from multiple different cells having the same primary scrambling code. There is no unique cell identifier, Cell ID, reported in the user terminal's measurement report according to current 3GPP standards. Accordingly, there is ambiguity or uncertainty as to which of the neighbouring femtos using that PSC provides the best signal to the user terminal and so should b handover target.

A known approach is to seek to handover to all of the femtocells that are identified as having the primary scrambling code of the best received signal. This is inefficient because only one of the handover attempts is permitted to succeed. Network resources that are used in the handover attempts to the other femtocells than the one that is successful, are wasted.

SUMMARY OF THE INVENTION

The reader is referred to the appended independent claims. Some preferred features are laid out in the dependent claims.

A method is provided of identifying which one of a plurality of femtocell base stations neighbouring a first base station is to be the target for handover of a call connection with a user terminal from the first base station, the femtocell base stations using code-division multiple access, CDMA, wherein the neighbour femtocell base stations use the same primary scrambling code as each other;

each of the neighbour femtocell base stations transmitting a respective broadcast signal that include timing information such that each neighbour femtocell base station transmits a respective broadcast signal having different timing information to that of the other neighbour femtocell base stations;

the user terminal receiving at least one of the broadcast signals, wherein the first base station being a first femtocell base station;

the user terminal determining the timing information of at least one of the received broadcast signals and reporting the timing information to the first femtocell base station; and the first femtocell base station identifying the target femtocell base station for handover from the timing information.

The inventors found a way to differentiate neighbour femtocell base stations that use the same Primary scrambling code as each other by considering differences in timing applied to signals on their broadcast channels. This enables a best neighbour handover candidate to be uniquely identified.

In preferred embodiments, a measurement report from a user terminal provides the identifying timing information.

Preferred embodiments enable a neighbour femtocell base station to be uniquely identified for handover despite the Primary scrambling code "reuse" that occurs in femtocell base station deployments. This reduces the resources used in signalling as part of handover attempts to multiple neighbours, only one of which will be successful. Accordingly, in preferred embodiments, delays and blocked or dropped calls are reduced.

In some embodiments, where a femtocell base station can only handle a few calls at a time, the reduced chance of calls being blocked is particularly significant.

BRIEF DESCRIPTION OF THE DRAWINGS

An embodiment of the present invention will now be described by way of example and with reference to the drawings, in which.

DETAILED DESCRIPTION

We now describe a network including femtocell base stations then look in greater detail at a femtocell base station and the relevant operation of the femtocell base station.

Network

Figure 1:
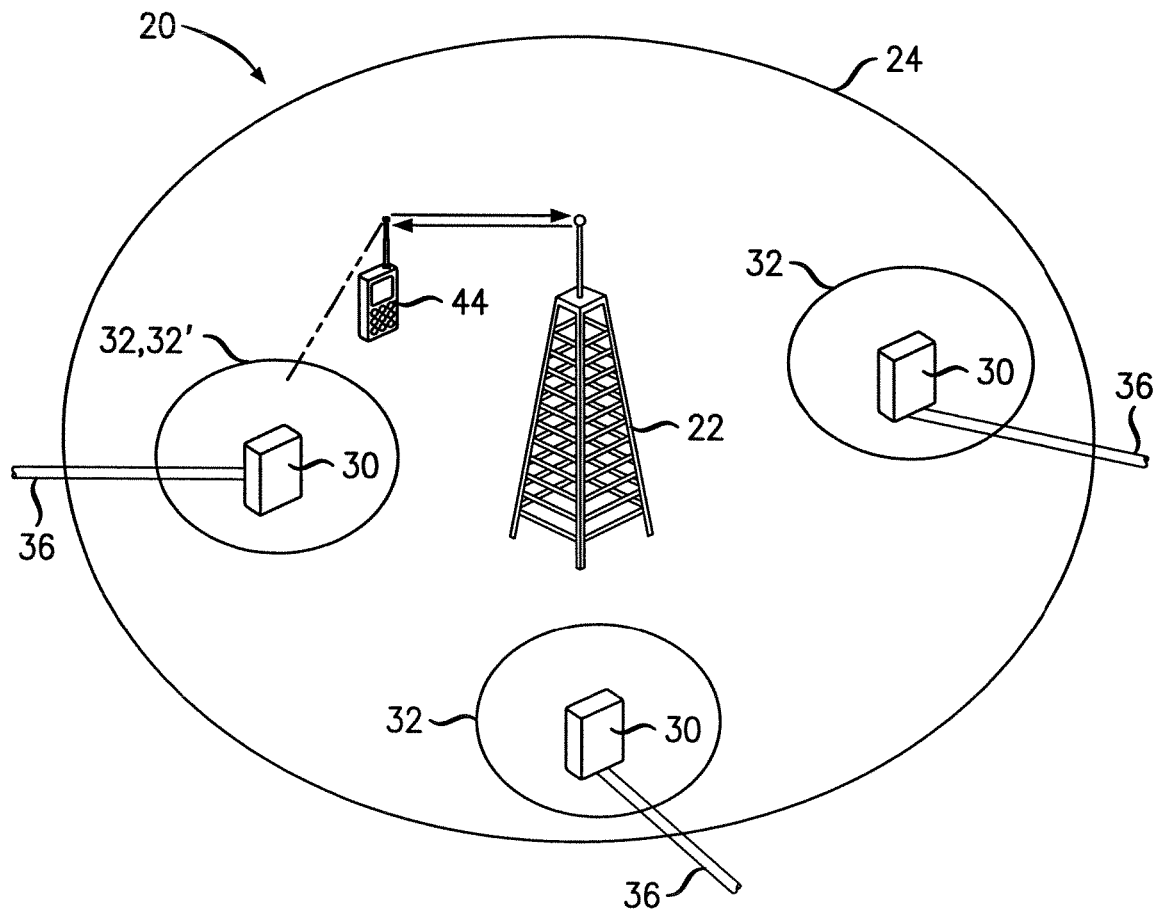
FIG. 1 is a diagram illustrating a wireless communications network according to an embodiment of the present invention.

As shown in FIG. 1, in one communication network 20, there are two types of base stations (often denoted BS or BSs): macrocell base stations and femtocell base stations. One macrocell base station 22 for wireless telecommunications is shown for simplicity in FIG. 1. The macrocell base station has a radio coverage area 24 that is often referred to as a macrocell. The geographic extent of the macrocell 24 depends on the capabilities of the macrocell base station 22 and the surrounding geography.

Within the macrocell 24, each femtocell base station 30 provides wireless communications within a corresponding femtocell 32. A femtocell is a radio coverage area. The radio coverage area of the femtocell 32 is much less than that of the macrocell 24. For example, the femtocell 32 corresponds in size to a user's home. In FIG. 1, three femtocell base stations 30 and corresponding femtocells 32 are shown for simplicity.

It is possible for a mobile terminal 34 within the macrocell 24 to communicate with the macrocell base station 22 in known manner. When the mobile terminal 34 enters into a femtocell 32 for which the mobile terminal is registered for communications within the femtocell base station 30, it is desirable to handover the connection with the mobile terminal from the macrocell to the femtocell. In the example shown in FIG. 1, the user of mobile terminal 34 is a preferred user of the nearest 32' of the femtocells 32.

As shown in FIG. 1, the femtocell base stations 30 are connected via broadband Internet Protocol connections ("backhaul") 36 to a core network (not shown in FIG. 1) and hence the rest of the telecommunications "world" (not shown in FIG. 1). The "backhaul" connections 36 allow communications between the femtocell base stations 30 through the core network (not shown). The macrocell base station is also connected to the core network (not shown).

Figure 2:
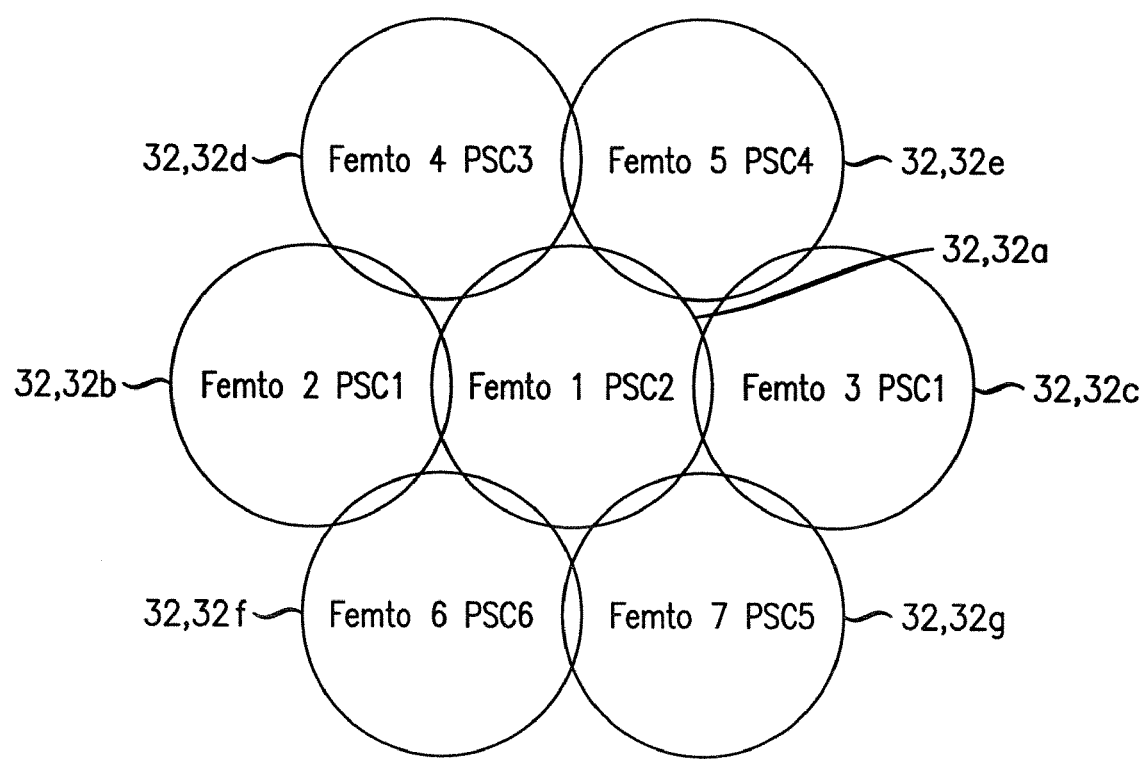
FIG. 2 is a diagram illustrating allocation of primary scrambling codes to femtocells in the network shown in FIG. 1.

As shown in FIG. 2, the femtocells 32 provide contiguous coverage, for example within an office building, and have six available primary scrambling codes. As shown in FIG. 2, in this example, these six codes, denoted PSC1,PSC2, ... , PSC6 are distributed so as to avoid neighbouring cells having the same primary scrambling a first femtocell 32a uses code PSC2, and has six neighbouring femtos. Of these, two femtocells 32b, 32c that neighbour the first femtocell 32a use the same code PSC1 as each other.

As regards the other femtocells 32d, 32e, 32f, 32g that neighbour the first femtocell 32a, these use the other five primary scrambling codes. Specifically, femtocell 32d uses PSC3, femtocell 32e uses PSC4, femtocell 32f uses PSC6, and femtocell 32g uses PSC5.

Femtocell Base Stations

Figure 3:
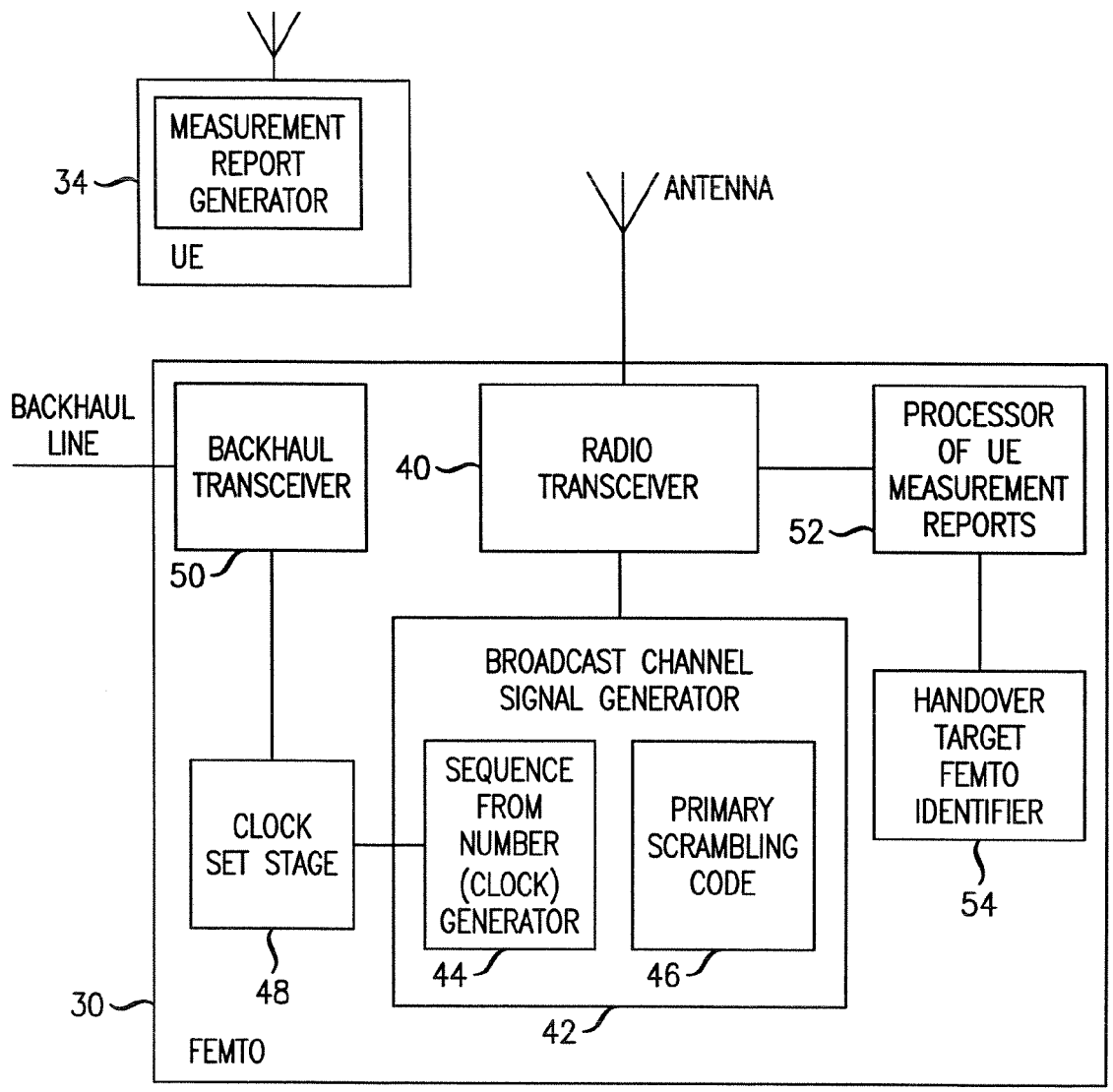
FIG. 3 is a diagram illustrating one of the femtocell base stations shown in FIGS. 1 and 2.

As shown in FIG. 3, the femtocell base station 30 consists of a radio transmitter-receiver, sometimes referred to as a radio transceiver 40. The radio transceiver 40 is connected to a broadcast channel (BCH) signal generator 42. The broadcast signal generator 42 includes a Cell System Frame Number (SFN) generator 44, and Primary scrambling code (PSC) information 46. The SFN generator is connected to a clock-setting stage 48 that is connected to a backhaul transceiver 50. The backhaul transceiver is connected to a backhaul line 56, for example one using Internet Protocol and connected to the Internet (not shown).

The radio transceiver 40 is also connected to a processor 52 of measurement reports received from a user terminal 34. The processor 52 is also connected to an identifier 54 of a handover target femtocell base station.

Broadcast Channel

In use, the BCH signal generator 42 sends broadcast signals that include both Primary scrambling code and current System Frame Number (SFN). SFN is a clock signal that increments from 0 to 255 every 10 mS, then repeats. The SFN has a timing offset which is set by the clock-setting stage 48 that receives a clock adjustment control signal via the backhaul line 56 and backhaul transceiver 50 from a central control node (not shown) which is part of the core network (not shown).

During the configuration of each femtocell base station, each femtocell base station is assigned a timing offset by the central control node, and also receives, from the central node, information of timing offsets of neighbouring femtocell base stations, in addition to their corresponding scrambling codes and cell identities (Cell IDs). Each femtocell base station stores this information that it receives.

The central control node gives different timing offsets to femtocell base stations. In particular, femtocell base stations that have the same Primary scrambling code and are within a group of neighbouring, handover candidate, femtocells are assigned different timing offsets.

The user terminal 34 is connected to the femtocell base station 30. The user terminal 34 acts to monitor signals having other Primary scrambling codes than the Primary scrambling code of the femtocell base station to which it is connected. The user terminal 34 is instructed to send a measurement report when a signal having another Primary scrambling code is received with a sufficiently high quality as to be suitable for handover.

There may be several femtocell base stations using the same Primary scrambling code that are potential "targets" for handover. Accordingly, the measurement report includes information on the timing difference between the "source" femtocell base station and the particular potential "target" femtocell base station. This timing difference is directly related to the difference between the offset applied to the Sequence Frame Number (SFN) in the source femtocell base station and the offset applied to the SFN in the potential target femtocell base station. For example, the timing difference is $CFN_{source} - SFN_{target}$ where $CFN_{source} = SFN_{source} + a$ known constant.

Figure 4:
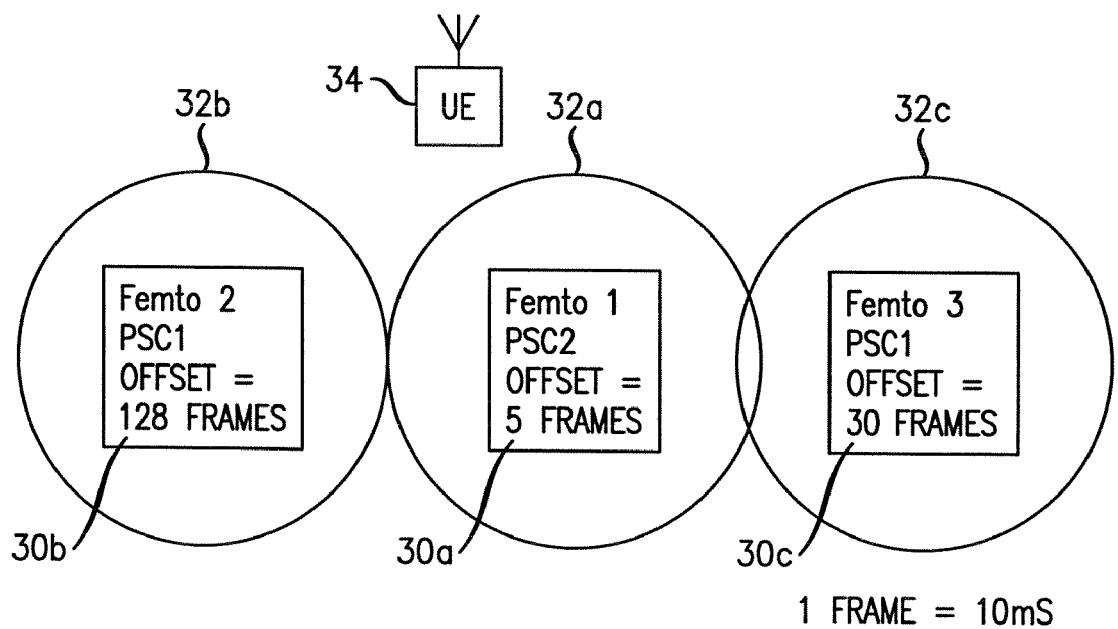
FIG. 4 is a diagram illustrating an example of a handover candidate femtocell being identified amongst the femtocells shown in FIG. 2 that use the same primary scrambling code.

As shown in FIG. 4, three of the femtocells 32a, 32b, 32c are such that the first femtocell base station 30a is the controlling ("source") femtocell base station for user terminal 34 and uses Primary scrambling code PSC2. Two femtocell base stations 30b, 30c are neighbours to the first femtocell base station 30a and use the same Primary scrambling code, namely PSC1. The femtocell base stations have different timing offsets set by the central control node against a known time point. In this example, second femtocell 30b has an offset of 128 frames, which is 1280 mS, because 1 frame lasts 10 milliseconds, in similar fashion, first femtocell base station 30a has an offset of 5, which corresponds to 50 mS. Third femtocell base station 30c has an offset of 30, which corresponds to 300 mS.

Upon receiving a signal of sufficient quality that includes Primary scrambling code PSC1, the user terminal 34 sends a measurement report to the first femtocell base station 30a that indicates that a received signal with PSC1 had become the strongest of the received signals from the monitored set of neighbouring femtocells base stations, so handover is appropriate.

The first femtocell base station 30a then takes the timing difference recorded in the measurement report and compares that against the information that it has received from the central node and stored as to the timing offsets assigned to its neighbouring femtocell base stations. For example, the measurement report includes a timing difference of say 1233 mS. Comparing this measured timing difference of 1233 mS to the expected timing differences (ignoring the propagation delays, that are small) of 1280−50=1230 mS for the second femtocell base station 30b and 300−50=250 mS for the third femtocell base station 30c, the second femtocell base station 30b is identified as the best handover candidate.

Random Setting of Timing Offsets

As an alternative to the setting of timing offsets by a central control node, in some otherwise similar embodiments, each femtocell, upon booting-up, sets the timing offset applied to SFN by selecting the offset randomly from between 0 and 255 seconds. Due to this randomness, there is a likelihood that two neighbouring femtocell base stations that use the same Primary scrambling code have sufficiently different timings to allow a confident identification of which is the correct best handover candidate. One option in this scenario is that the first femtocell base station will query the neighbour as to its timing offset using so-called "layer 3" signalling of known type. Specifically, the first femtocell base station knows its own timing offset and queries the neighbouring femtocell base stations as to their timing offsets.

Another option is for the first femtocell base station to determine timing offsets by receiving broadcast signals from neighbours. Specifically, the first femtocell base station measure the timing offset of a neighbour femtocell base station directly, for example by switching its receiver to monitor the broadcast signal of neighbour, and comparing the measured timing with its own timing so as to calculate the timing offset of the neighbour. In this situation, the first femtocell base station may also decode a Cell ID in a received broadcast signal. The Cell ID uniquely identifies the neighbour that sent the signal. Accordingly, the first femtocell base station associates the measured timing offset of the neighbour with the neighbour's Cell ID. In accordance with current UMTS standards, user terminals do not report Cell ID, but a femtocell base station may.

Another option, where femtocell base stations randomly select their own timing offsets from within the range 0 to 2.55 seconds, is learning the timing offsets of neighbour femtocell base stations from measurement reports provided by user terminals and history as to handover success. Specifically, the first ("source") femtocell base station, having a set of neighbouring base stations using the same Primary scrambling code as each other, attempts to handover a call connection to a user terminal to each of the neighbouring base stations. Upon one of the handover attempts being successful, the "source" femtocell base station records the measurement report from the user terminal that the "source" femtocell base station received just prior to the handover. Subsequently the "source" femtocell base station considers the value of timing offset calculated from that measurement report as the timing offset of the neighbouring base station to which the handover was successful. Importantly, upon a further measurement report from a user terminal providing a timing offset that is close to this value, the source femtocell base station then makes, as a first choice, a handover attempt to this neighbour femtocell base station; in other words, this neighbour femtocell base station is considered the handover "target".

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method of identifying which one of a plurality of femtocell base stations neighbouring a first base station is to be the target for handover of a call connection with a user terminal from the first base station, the femtocell base stations using code-division multiple access, CDMA, wherein the neighbour femtocell base stations use the same primary scrambling code as each other, the method comprising:

transmitting by each of the neighbour femtocell base stations a respective broadcast signal that include timing information such that each neighbour femtocell base station transmits a respective broadcast signal having different timing information to that of the other neighbour femtocell base stations;

receiving by the user terminal at least one of the broadcast signals;

determining by the user terminal the timing information of at least one of the received broadcast signals and reporting the timing information to the first base station; and identifying by the first base station the target femtocell base station for handover from the timing information;

in which the first base station has records of expected timing information associated with at least one of the neighbour femtocell base stations, and compares the determined timing information to the recorded expected timing information of at least one neighbour femtocell base station so as to identify which one of the neighbour femtocell base stations is to be target femtocell base station for handover;

wherein the first base station being a first femtocell base station;

for each of the femtocell base stations, the respective expected timing information is dependent upon a timing offset applied to the broadcast signals on a broadcast channel transmitted by that femtocell base station;

each femtocell base station selects a timing offset from a range, in a random or pseudo-random manner; and in which the first femtocell base station attempts to handover a call connection with the user terminal to each of the neighbouring femtocell base stations, and upon one of the handover attempts being successful, the first femtocell base station records the measurement report from the user terminal that the first femtocell base station received just prior to handover, and considers the value of the timing offset calculated from that measurement report as the timing offset of the neighbouring base station to which the handover was successful.

2. A method according to claim 1, in which, for each of the neighbouring femtocell base stations, the respective expected timing information is the timing offset applied at that femtocell base station minus the timing offset applied at said first femtocell base station.

3. A method according to claim 1, in which the timing offset is that applied to a clock signal used by the femtocell base station, the clock signal being System Frame Number, SFN.

4. A method according to claim 1, in which the neighbour femtocell base stations inform the first femtocell base station of their respective timing offsets.

5. A method according to claim 1, in which the first femtocell base station records the timing offset derived from a previous measurement report from the user terminal and used in a previously successful handover to a neighbour femtocell base station as the timing offset of that neighbour base station.

6. A method according to claim 1, in which the first femtocell base station learns the timing offsets of the neighbour femtocell base stations by the first femtocell base station receiving previous broadcast signals from the neighbour femtocell base stations.

7. A method according to claim 1, in which the femtocell base stations are in a network that also comprises a central control node, the central control node assigning each timing offset to each femtocell base station and informing the femtocell base stations of the respective timing offsets assigned.

8. A method according to claim 1, in which the user terminal receives more than one of the broadcast signals, and selects for the determination of the timing information the received broadcast signal that is the best quality and/or strongest of the received broadcast signals.

9. A method according to claim 1, in which the femtocell base stations are Universal Mobile Telecommunications System, UMTS, femtocell base stations.

10. A network for wireless communications comprising: a first base station and a plurality of neighbour femtocell base stations neighbouring the first base station, the femtocell base stations being configured to use code-division multiple access, CDMA;
    each of the neighbour femtocell base stations comprising an encoder and a transmitter, the encoder being configured to encode a broadcast signal using the same primary scrambling code as used in the other of the neighbour femtocell base stations, the transmitter being configured to transmit the broadcast signal that includes timing information, whereby, in use, each neighbour femtocell base station transmits a broadcast signal having timing information that is different to that of the other neighbour femtocell base stations;
    the first base station comprises a receiver configured to receive a report from a user terminal of timing information of at least one of the broadcast signals received by the user terminal,
    the first base station also comprising a handover target identifier configured to identify from the timing information which one of the neighbouring femtocell base stations is to be the target for handover of a call connection with a user terminal from the first base station;
    the first base station has records of expected timing information associated with at least one of the neighbour femtocell base stations, and is configured to compare the determined timing information to the recorded expected timing information of at least one neighbour femtocell base station so as to identify which one of the neighbour femtocell base stations is to be target femtocell base station for handover;
    wherein the first base station is a first femtocell base station;
    for each of the femtocell base stations, the respective expected timing information is dependent upon a timing offset applied to the broadcast signals on a broadcast channel transmitted by that femtocell base station;
    each femtocell base station is configured to select a timing offset from a range, in a random or pseudo-random manner; and
    in which the first femtocell base station is configured to attempt to handover a call connection with the user terminal to each of the neighbouring femtocell base stations, and upon one of the handover attempts being successful, to record the measurement report from the user terminal that the first femtocell base station received just prior to handover, and to consider the value of the timing offset calculated from that measurement report as the timing offset of the neighbouring base station to which the handover was successful.

11. A network according to claim 10, further comprising the user terminal configured to receive at least one of the broadcast signals, select one of the received broadcast signals, determine the timing information from the selected signal and report the timing information to the first femtocell base station.

12. A network according to claim 10, in which the femtocell base stations are Universal Mobile Telecommunications System, UMTS, femtocell base stations.

* * * * *